United States Patent [19]

Dvorov et al.

[11] 4,012,829
[45] Mar. 22, 1977

[54] SHAPING-AND-CUTTING BROACH

[76] Inventors: Jury Ivanovich Dvorov, Yaroslavskoe Shosse, 8, korpus 2, kv. 614; Vladislav Evgenievich Orlov, ulitsa Molostovykh, 1, korpus 2, kv. 157, both of Moscow, U.S.S.R.

[22] Filed: Mar. 5, 1976

[21] Appl. No.: 664,069

[52] U.S. Cl. ............................. 29/567; 29/90 R; 29/95.1

[51] Int. Cl.² .................................... B26D 1/00

[58] Field of Search ................. 29/567, 95.1, 90

[56] References Cited

UNITED STATES PATENTS

| | | | |
|---|---|---|---|
| 1,197,132 | 9/1916 | LaPointe | 29/95.1 |
| 2,140,146 | 12/1938 | Tautz | 29/95.1 |
| 3,097,426 | 7/1963 | Hill | 29/567 |
| 3,317,984 | 5/1967 | Jacobson | 29/95.1 |
| 3,439,398 | 4/1969 | Zawacki et al. | 29/95.1 |

FOREIGN PATENTS OR APPLICATIONS 533,274 2/1941 United Kingdom ............... 29/95.1

*Primary Examiner*— Leonidas Vlachos
*Attorney, Agent, or Firm*—Fleit & Jacobson

[57] ABSTRACT

A shaping-and-cutting broach comprising cutting and gauging teeth and a shaping element located before the cutting teeth, said shaping element provided with projections on its surface which contacts the machined surface. Owing to said projections each cutting tooth has a continuous cutting edge and this, in turn, increases the strength of the tool as a whole and reduces the cost of its manufacture and operation.

6 Claims, 21 Drawing Figures

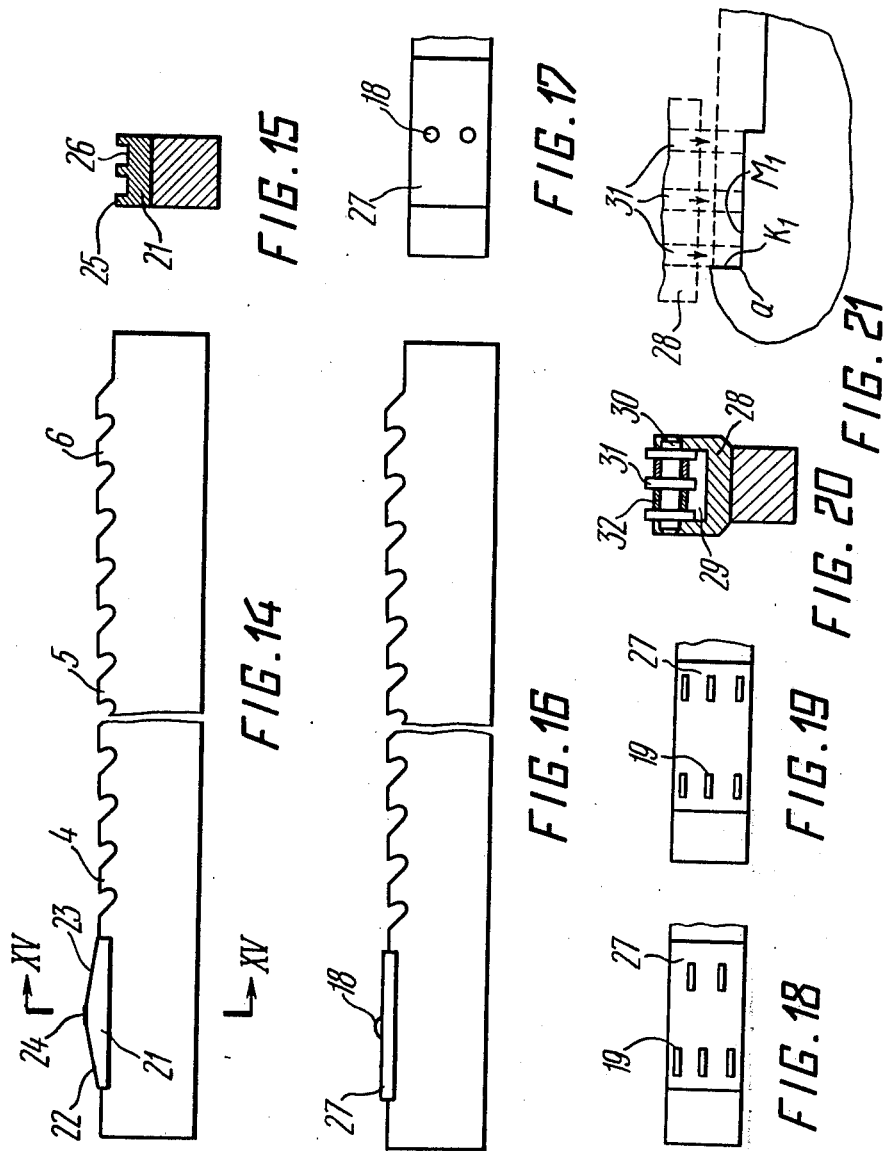

SHAPING-AND-CUTTING BROACH

The present invention relates to machining of metals and more particularly, to shaping-and-cutting broaches.

Such shaping-and-cutting broaches can be employed most successfully for machining holes, slots and flat stepped surfaces.

Known in the previous art are shaping-and-cutting broaches (see, for example, Author's Certificate No. 241930, Cl. B23d of International Patent Classification, USSR) comprising cutting and gauging teeth and a shaping element located before said cutting teeth.

The shaping element of such broaches for machining holes is made in the form of a bushing whose external surface is formed by the relieving and back cones whose bases face each other and have a continuous cylindrical band in between. The shaping element of the broaches for machining flat surfaces is made in the form of a prism whose external surface is formed by the relieving and back bevels with a flat band in between.

The cutting teeth that follow the shaping element have chip flutes, the height of these cutting teeth being larger than that of the shaping element whose surface interacting with the work is continuous.

Thus, in the course of machining, the surface layer of metal is compacted and then subjected to cutting operation.

This sequence of machining operations yields positive results in broaching soft materials only.

In case of high-strength metals, cutting of the compacted layer aggravates the wear of the cutting teeth considerably, especially the corners of the cutting edges. This reduces the strength of the broach as a whole.

The disadvantages of the known broach also include difficulties in its manufacture and sharpening. Besides, making a large number of chip flutes calls for the use of many grinding wheels.

The main object of the present invention resides in providing a shaping-and-cutting broach with a shaping element whose design would make it possible to dispense with the chip flutes on the cutting portion of the broach and with the corner cutting edges thus increasing the tool life simplifying its manufacture and sharpening, and making this broach suitable for machining both soft and hard metals.

This object is accomplished by providing a shaping-and-cutting broach comprising cutting and gauging teeth and a shaping element located before said cutting teeth wherein, according to the invention, the surface of the shaping element interacting with the work has projections whose height is essentially larger than the total feed of the cutting teeth, each of said teeth having a continuous cutting edge.

The provision of the shaping element with projections makes it possible to provide a shaping-and-cutting broach which cuts longitudinal slots on the machined surface, these slots dividing said surface into portions limited in width. Subsequently, these portions are cut off by the cutting teeth with continuous cutting edges, the width of the chips being equal to that of each of said portions. As a result, there is no need for making chip flutes on the cutting teeth of the broach. Due to elimination of the quick-wearing corner portions of the cutting edges the tool life of cutting teeth considerably increases. Besides, the provision of cutting teeth with continuous cutting edges gives a reduction in the amount of labour required for the manufacture and sharpening of the shaping-and-cutting broach.

In view of the fact that the height of the projections of the shaping element is essentially larger than the total feed of the cutting teeth, the metal is compacted in the depth of the formed slots and the cutting teeth of the broach remove the portions of non-compacted metal thus permitting machining of both soft and high-strength metals.

According to one of the embodiments of the invention the shaping element takes the form of a bushing which tapers down towards the ends and has spline-like projections formed by the longitudinal slots.

This type of the shaping element allows the broach to be used for making slots of any profile and size depending on the dimensions and shape of the surface being machined.

In another embodiment of the invention the shaping element has the form of a bushing with radial projections formed by rolling elements and spaced at least in one row around its entire circumference.

Due to this design of the shaping element it is possible to make the projections from tool metals, the rest being made from construction steel. This solution simplifies the manufacture of the shaping-and-cutting broach, saves the tool metals and, eventually, cheapens the broach.

It is practicable that the shaping element should be made in the form of a rectangular prism whose external surface is beveled towards the ends and has spline-like projections formed by the longitudinal slots.

This design of the shaping element allows machining of flat surfaces, slots and flat stepped surfaces.

This solution makes it possible to machine the corner portions of the slots and stepped surfaces by plastic deformation which dispenses with the corner portions of the cutting edges in the shaping-and-cutting broaches, since said corner portions are subjected to heaviest wear in the course of broaching.

According to a further embodiment of the invention the shaping element is made in the form of a rectangular plate with projections formed by rolling elements, arranged at least in one row over its external surface and directed essentially parallel to its faces.

In such a solution the projections of the shaping element can be made of tool metals, the rest being made from construction steel. This simplifies the manufacture of the shaping-and-cutting broach, gives a saving in the tool metals and, eventually, cheapens the broach.

According to still another version of the shaping-and-cutting broach the external surface of the plate has a longitudinal slot which accommodates rotatable rollers on a common shaft which is essentially parallel to the plate faces.

This layout of the shaping element makes it possible to machine slots without sliding friction thus improving the strength of the projections.

Given below is a detailed description of a few possible versions of the shaping-and-cutting broach with reference to the accompanying drawings, in which:

FIG. 14 is a schematic general side view of the shaping-and-cutting broach for machining slots and flat stepped surfaces according to the invention;

FIG. 15 is a section taken along line XV—XV in FIG. 14;

FIG. 16 — same as in FIG. 14 with another version of the shaping element;

FIG. 17 shows the arrangement of the rolling elements (balls) of the shaping element in one row;

FIG. 18 shows the arrangement of the rolling elements (rollers) of the shaping element in two rows;

FIG. 19 — same as in FIG. 18, another version;

FIG. 20 — shows the arrangement of the rollers in the slot of the shaping element;

FIG. 21 shows a scheme of broaching a stepped surface with the aid of a flat broach according to the invention.

Figure 1:
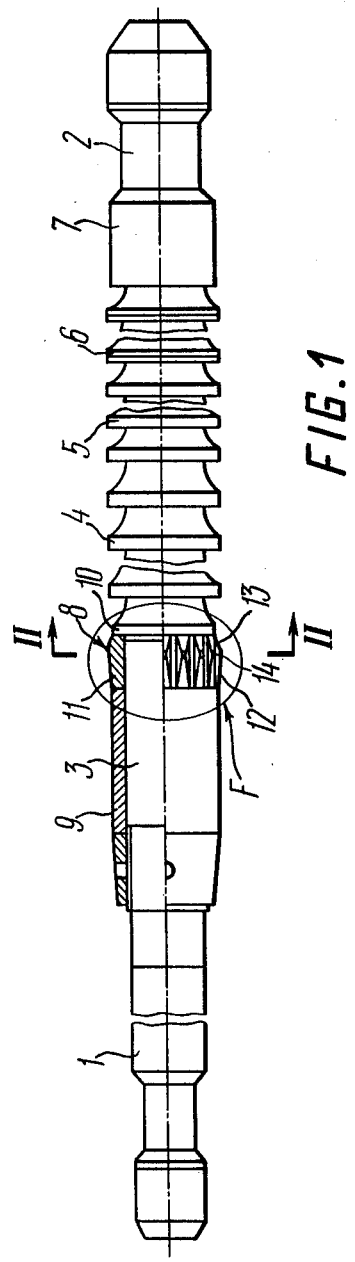
FIG. 1 represents a general schematic side view of the shaping-and-cutting broach for machining round holes, with a partial cutout.

The shaping-and-cutting broach intended for machining round holes has the front and rear shanks 1 and 2 respectively (FIG. 1); located in succession between said shanks is a front guide portion 3, cutting teeth including roughing teeth 4, finishing teeth 5, gauging teeth 6, and a rear guide portion 7.

Slipped on the front guide portion 3 is a shaping element 8 arranged coaxially with the cutting teeth, and a replaceable guide bushing 9 which presses the shaping element 8 against a shoulder 10. The replaceable guide bushing 9 is secured on the front guide portion 3 by any known method suitable for this purpose.

Figure 2:
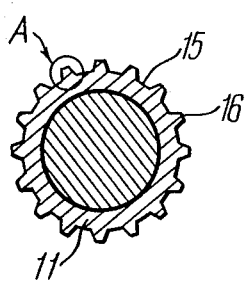
FIG. 2 is a section taken along line II—II in FIG. 1.

According to the invention, the shaping element 8 is made in the form of a bushing 11 whose external surface is tapered towards the ends, said surface forming a relieving cone 12 and a back cone 13. Located between said cones is a cylindrical portion 14. The external surface of the bushing 11 has longitudinal slots 15 (FIG. 2) which form spline-like projections 16 whose height is essentially greater than the total feed of the cutting teeth. The cutting edge of each cutting tooth is continuous. The taper angles of the cones 12 and 13 and the width of the cylindrical portion 14 depend on the physical and mechanical properties of the machined material, the machining allowance, the parameters of the machined surface, etc.

Figure 4:
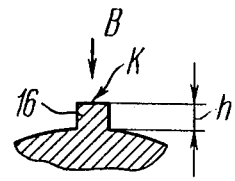
FIG. 4 shows another version of fragment A in FIG. 2.
Figure 3:
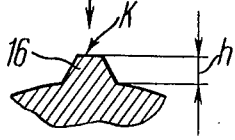
FIG. 3 shows fragment A in FIG. 2, enlarged.

The cross sections of the projections 16 may differ in shape, the rectangular (FIG. 4) and trapezoidal (FIG. 3) shapes being preferable.

Figure 5:
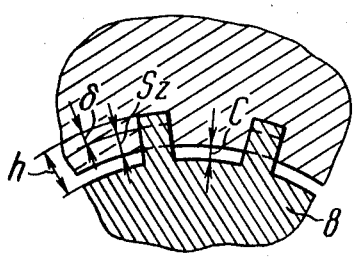
FIG. 5 shows the position of the projections of the shaping element cutting into the machined surface in the course of shaping.

The height $h$ of the projections 16 (FIG. 5) is essentially greater than the total feed of the cutting teeth and can be derived from the following formula:

$$h = (S_z + C) + \delta,$$

where $S_z$ = total radial feed of the cutting teeth, i.e. the radial lift of the last cutting tooth above the first one;

$C$ = required clearance between the machined surface and the bottom of the slot in the shaping element;

$\delta$ = setting-down of the shaped surface; this should be understood as the change in the parameters of the machined surface as compared with the cross-sectional dimensions of the projections of the shaping element.

The amount of setting-down of the shaped surface depends on the properties of the machined material, thickness of the shaped layer (depth of slot of the shaping element), configuration of the workpiece shape of the projections of the shaping element, and on the conditions of broachins (type of cutting fluid, broaching speed, etc.).

It is practicable that the minimum width of surface K (FIGS. 3 and 4) of each projection 16 should be not smaller than its height $h$.

Figure 7:
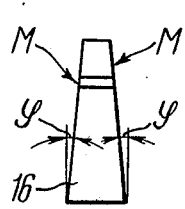
FIG. 7 is a view along arrow B in FIG. 4, enlarged (another version)

The side surfaces M of each projection 16 have a rake angle $\phi$ (FIG. 7) of $30' - 1°$. This facilities the process of plastic deformation due to decreased friction of the side surfaces M of the shaping element against the machined surface.

Figure 6:
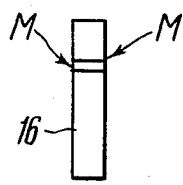
FIG. 6 is a view along arrow B in FIG. 4, enlarged.

However, in a number of cases the side surfaces M of the projections 16 made be made without the angle $\phi$ (FIG. 6) for example when the machining allowance reaches 0.5 mm.

Figure 8:
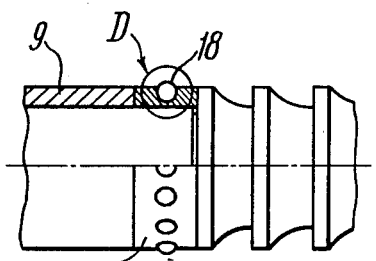
FIG. 8 shows a version of fragment F in FIG. 1.
Figure 9:
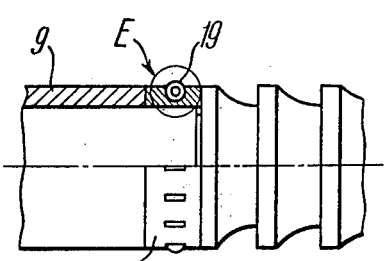
FIG. 9 shows a version of fragment F in FIG. 1.

According to another embodiment of the invention the shaping element is made in the form of a cylindrical bushing 17 (FIGS. 8, 9) with radial projections formed by rolling elements and arranged in one row along the circumference of the bushing. The number of these rows can be increased depending on the machining allowance and the dimensions of the machined surface.

The rolling elements are either balls 18 or rollers 19. The balls 18 (FIG. 10) and rollers 19 (FIG. 11) are rigidly secured in the sockets of the bushing 17 by any suitable method.

Figure 12:
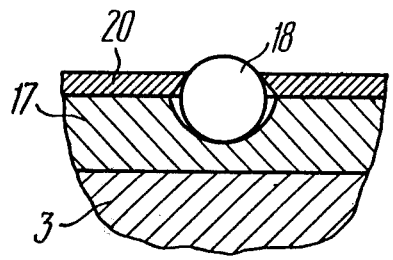
FIG. 12 shows another version of fragment D in FIG. 8, enlarged.
Figure 13:
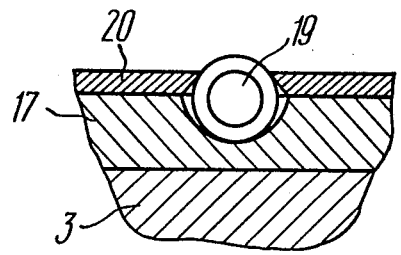
FIG. 13 shows another version of fragment E in FIG. 9, eblarged.

Besides, the balls 18 and rollers 19 can be secured with a possibility of rotation (FIGS. 12, 13). In this case the external surface of the bushing 17 has hollows accommodating said rolling elements. The bushing 17 is mounted with a cage 20 of any known design for fastening balls 18 and rollers 19 with a provision for their rotation. This method provides for changing portions of their surfaces contacting the machined surfaces. This is accompanied by the sliding friction at the bearing points of said balls 18 and rollers 19.

The flat and stepped surfaces of slots are machined by flat broaches illustrated in FIGS. 14 and 16. The shaping element of these broaches is made in the form of a prism 21 (FIG. 14) rigidly secured on this broach.

The external surface of the prism 21 has bevels 22 and 23 and a flat band 24 in between. The projections 25 (FIG. 15) are formed by spline-like longitudinal slots 26 directed towards the machined surfaces.

Figure 10:
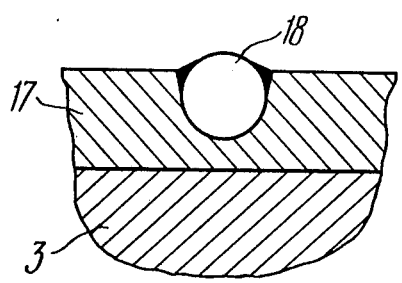
FIG. 10 shows fragment D in FIG. 8, enlarged.
Figure 11:
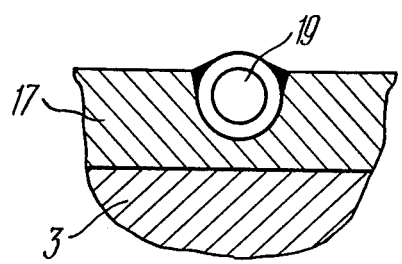
FIG. 11 shows fragment E in FIG. 9, enlarged.

According to one of the embodiments of the invention, the shaping element is made in the form of a rectangular plate 27 (FIG. 10). The projections of this plate are constituted by rolling elements, e.g. balls 18 (FIG. 17) and are arranged on its external surface in one row, essentially parallel to the faces of this plate 27.

The rolling elements, e.g. rollers 19 (FIGS. 18 and 19) can be arranged in more than one row depending on the width of the machined surface and the machining allowance. In one case the rolling elements 19 (FIG. 18) are arranged in a staggered order, displaced laterally in adjacent rows. In the other case the rolling elements 19 (FIG. 19) are arranged without such displacement, the projections in each successive row directed towards the cutting teeth 4, 5 being higher than the projections of the preceding row. The rolling elements can be secured either rigidly or rotatably by the methods similar to those described above in the example of the broach the machining holes.

The shaping element can be made in the form of a plate 28 (FIG. 20) whose external surface is provided with a longitudinal slot 29 whose walls accommodate a shaft arranged essentially parallel to the faces of the plate 28. Installed rotatably on the shaft 30 are rollers 31 with spacer rings 32 between them. This arrangement of the rollers dispenses with the sliding friction during slotting of the machined surface.

Broaching with the aid of a shaping-and-cutting broach, e.g. in machining round holes is carried out as follows.

The front shank 1 (FIG. 1) of the shaping-and-cutting broach is passed through the hole to be machined. Then the broach is shifted axially. The relieving cone 12 of the shaping element 8 comes in contact with the machined surface. The projections 16 penetrate into the machined surface and ensure its plastic deformation thus producing longitudinal slots whose depth is essentially equal to the machining allowance. This is accompanied by compacting of the metal on the bottom of the slots. The machined surface acquires an intermittent shape. The portions of the machined surface between the formed slots remain non-compacted and come in contact with the cutting teeth 4 and 5 of the broach, said teeth following the shaping element 8. These cutting teeth with continuous cutting edges cut off chips whose width is equal to that of the portions of the machined surface between the slots formed thereon. The thickness of the layer of material cutt off in one run of the shaping-and-cutting broach is equal to the machining allowance. The gauging teeth 6 gauge the machined surface to the predetermined size.

The stepped flat surfaces are machined by a flat shaping-and-cutting broach with the shaping element in the form of a plate 28 with rollers 31. Machining of the corner portion $K_1$-$M_1$ (FIG. 21) of the stepped surface by the rollers 31 is accomplished by plastic deformation of the surfaces $K_1$ (the direction of deformation is shown by arrows) located sideways of the rollers. The surface $K_1$ and part of the surface $M_1$ are compacted near angle $a$. As a result, a slot is formed along the surface $K_1$, said slot separating the remaining non-compacted part of the surface $K_1$, said slot separating the remaining non-compacted part of the surface $M_1$ which is cut off by the cutting teeth 4 and 5 of the broach. Gauging of the surface is performed by the gauging teeth 6.

What we claim is:

1. A shaping-and-cutting broach comprising: cutting teeth, each having a continuous cutting edge; gauging teeth; a shaping element located before said cutting teeth and provided with projections on the external surface which interacts with the machined surface in the course of broaching; said projections whose height is essentially greater than the total feed of said cutting teeth.

2. A shaping-and-cutting broach according to claim 1 wherein the shaping element is made in the form of a bushing whose external surface is tapered toward the ends and has spline-like projections formed by longitudinal slots.

3. A shaping-and-cutting broach according to claim 1 wherein the shaping element is made in the form of a bushing with radial projections formed by the rolling elements and arranged in at least one row around its circumference.

4. A shaping-and-cutting broach according to claim 1 wherein the shaping element is made in the form of a prism whose external surface has bevels directed towards the ends, and spline-like projections formed by the longitudinal slots.

5. A shaping-and-cutting broach according to claim 1 wherein the shaping element is made in the form of a rectangular plate with projections formed by the rolling elements arranged in at least one row on its external surface, essentially parallel to its faces.

6. A shaping-and-cutting broach according to claim 5 wherein the external surface of said plate is provided with a longitudinal slot accommodating rollers mounted rotatably essentially parallel to face on a common shaft.

* * * * *